United States Patent [19]

Weber

[11] Patent Number: 4,931,493

[45] Date of Patent: Jun. 5, 1990

[54] BENEFICIATED TALCS

[75] Inventor: Kenneth E. Weber, Pacific Palisades, Calif.

[73] Assignee: Cyprus Mines Corporation, Englewood, Colo.

[21] Appl. No.: 248,168

[22] Filed: Sep. 23, 1988

Related U.S. Application Data

[62] Division of Ser. No. 3,242, Jan. 14, 1987, Pat. No. 4,820,347.

[51] Int. Cl.$^5$ ............................................. C08K 5/06
[52] U.S. Cl. ..................................... 524/375; 524/377; 524/385; 524/451; 523/205
[58] Field of Search ............... 524/375, 377, 385, 451; 523/205

[56] References Cited

U.S. PATENT DOCUMENTS 4,263,050 4/1981 Yamanaka et al. ................. 524/451

Primary Examiner—Joseph L. Schofer
Assistant Examiner—Peter D. Mulcahy
Attorney, Agent, or Firm—Lyon & Lyon

[57] ABSTRACT

Means are disclosed for rendering talcs such as Montana talc or like talcs hitherto considered incompatible or unsuitable as fillers for thermoplastic resinous compositions, and particularly polypropylene molding resins, suitable for this use. Such talcs, which in their unbeneficiated state strongly discolor the resinous matrix and affect its long-term heat stability, are beneficiated in accordance with this invention, generally at low cost, while improving or at least not unacceptably diminishing other significant physical properties, particularly yellowness index, flexural modulus and impact strength, of the resulting molded article. This is accomplished by admixing Montana talc or the like with an effective amount of a combination of:

(A) one or a mixture of certain octyl- or nonylphenol/poly(ethylene oxide) condensates, and
(B) one or a mixture of certain poly(ethylene glycols) or alkoxypoly(ethylene glycols).

10 Claims, 5 Drawing Sheets

PARTICLE SIZE DISTRIBUTION

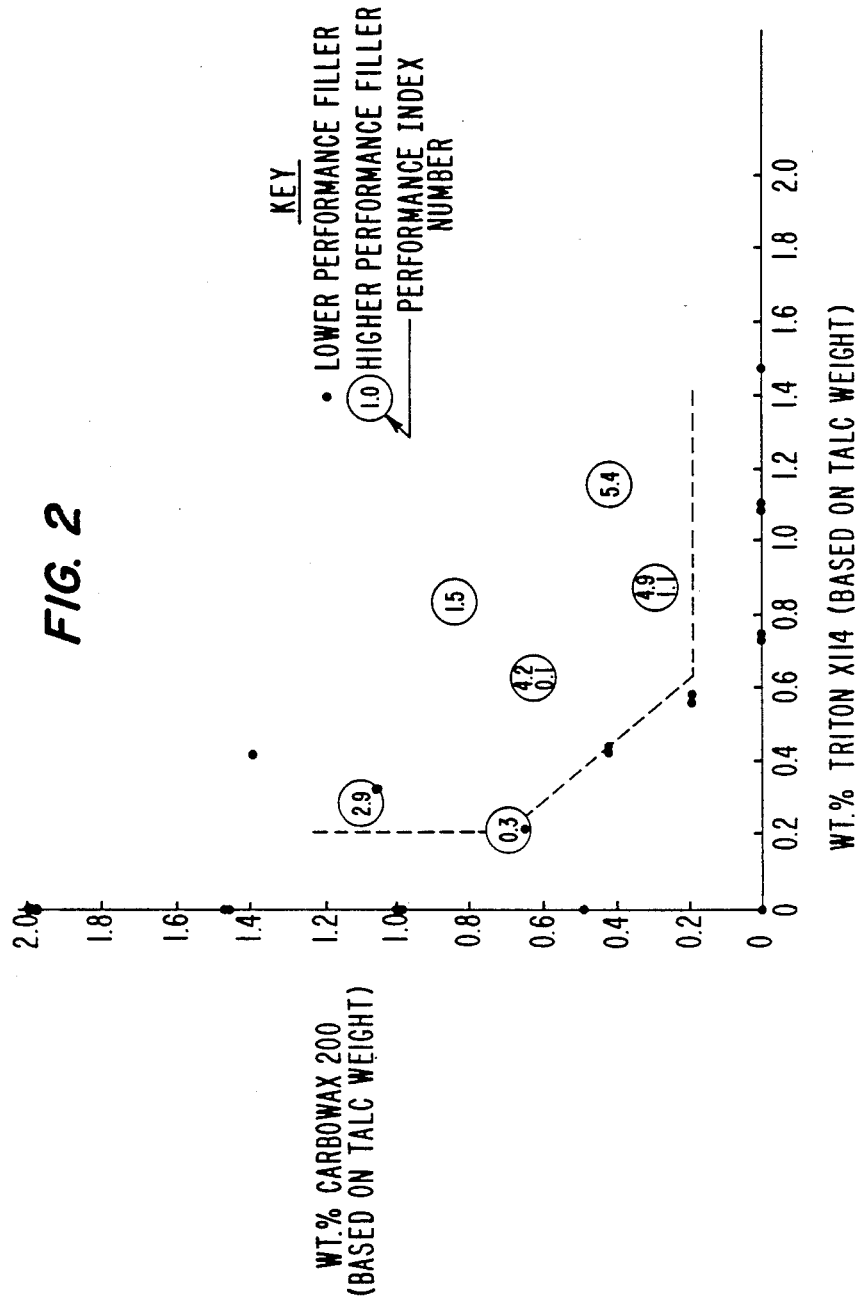

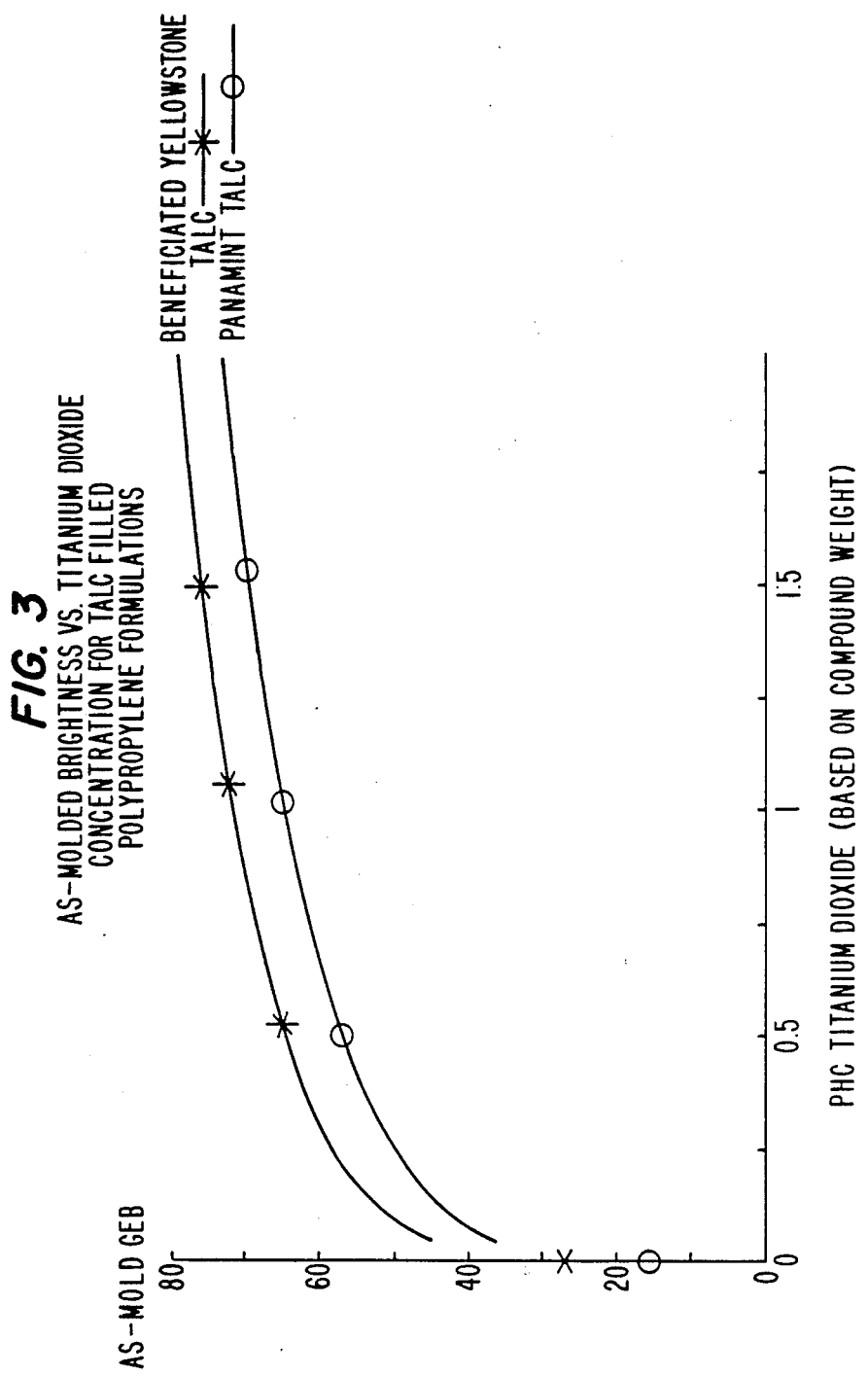

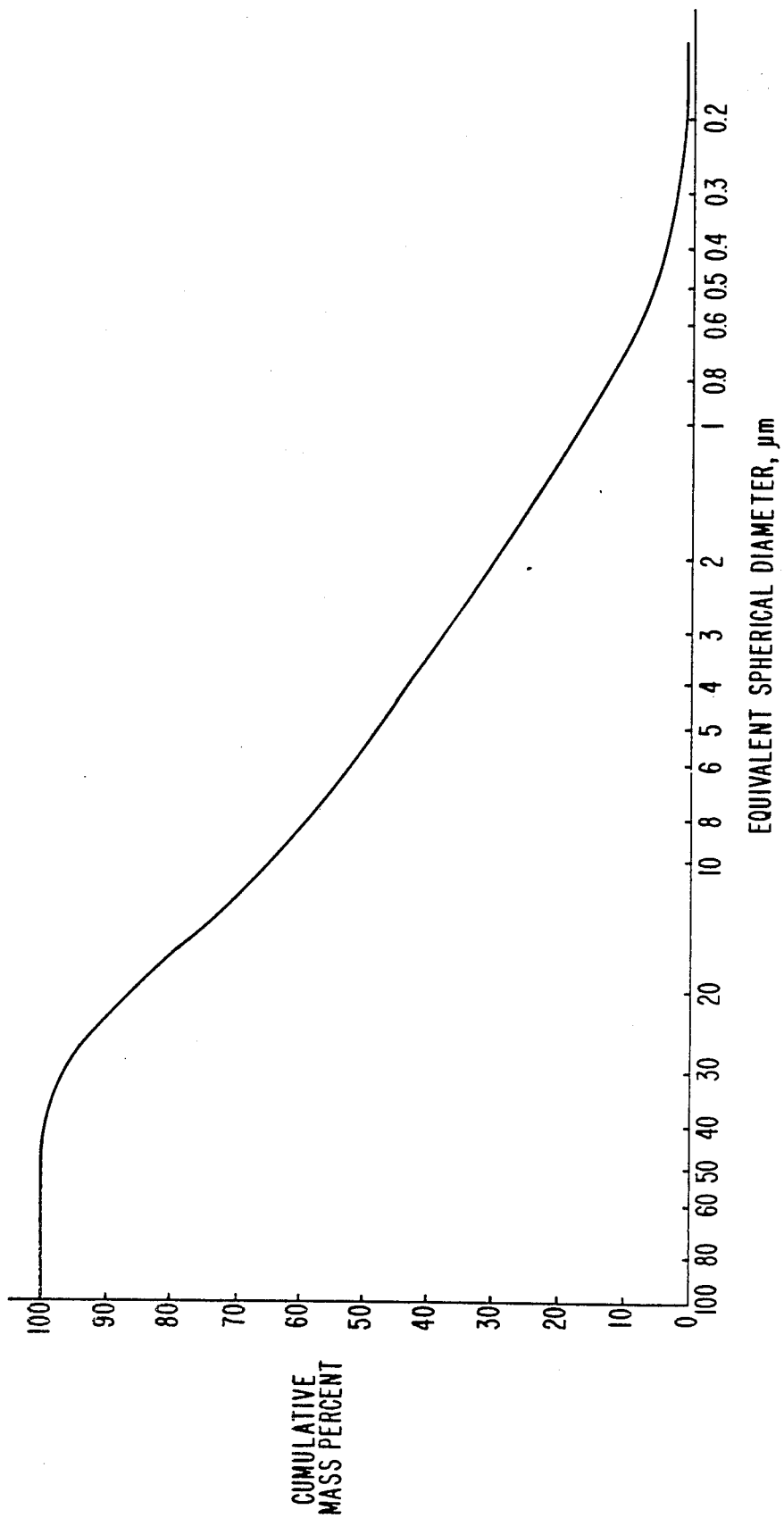

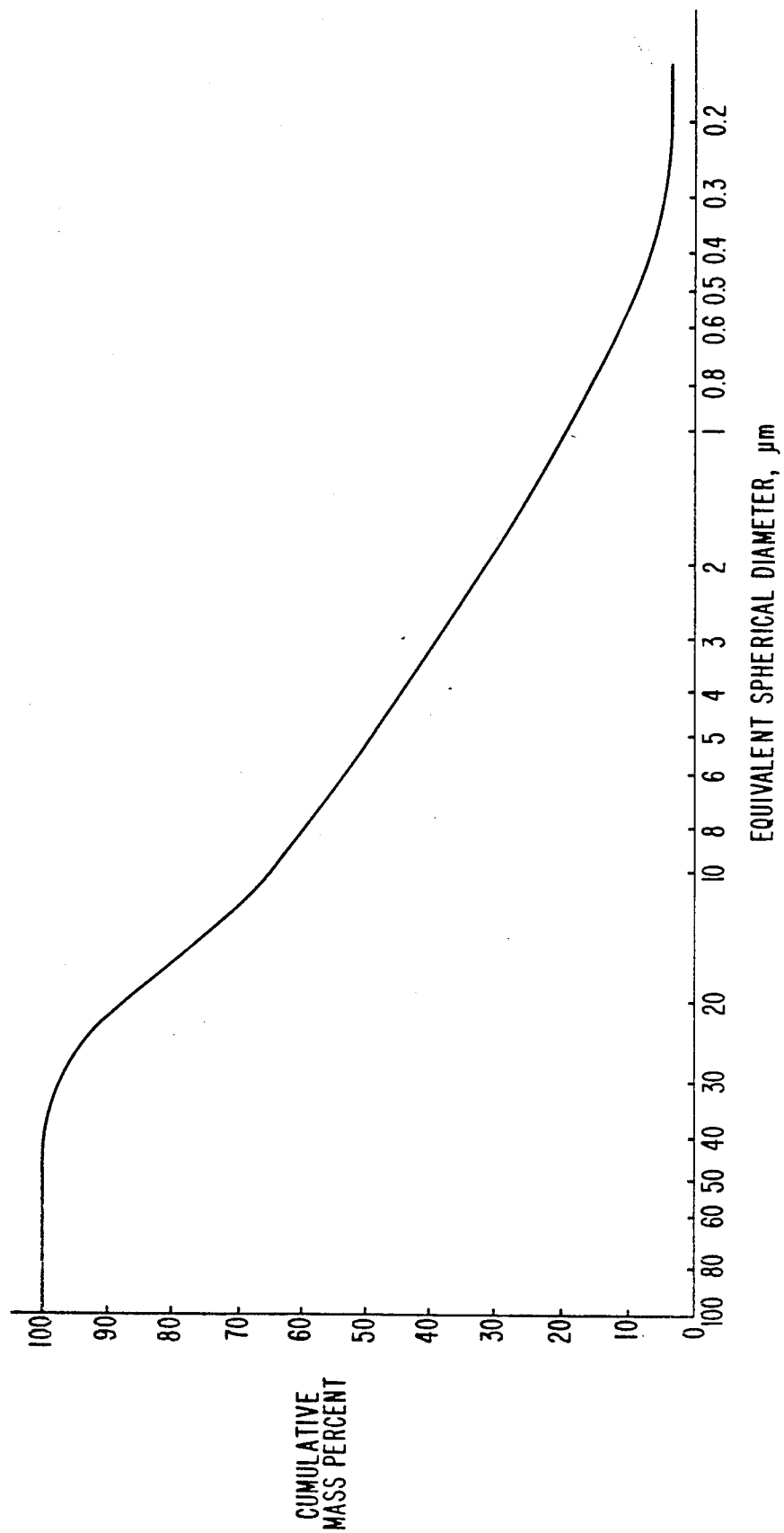

BENEFICIATED TALCS

This application is a division of applicant's copending U.S. patent application Ser. No. 003,242, now U.S. Pat. No. 4,820,347, issued Apr. 11, 1989.

FIELD OF THE INVENTION

This invention relates to novel, improved, low cost beneficiated talcs. More particularly, this invention relates to means for improving the performance characteristics both of talcs hitherto considered unsuitable per se as fillers for thermoplastic resinous compositions, and to the resulting improved talcs themselves. This invention further relates to thermoplastic resinous compositions filled with incompatible or unsuitable talcs which have been improved in accordance with the invention and to articles molded therefrom whose physical properties, particularly brightness and oven life (long-term heat stability), as well as color, impact strength and other tensile properties, are comparable to those exhibited by molded articles filled with "superior" talcs.

BACKGROUND OF THE INVENTION

Talc is a relatively abundant, inexpensive, highly water-insoluble, hydrophobic and generally unreactive mineral. It can be categorized as a hydroxylated magnesium silicate and represented by, inter alia, one or more of the formulas:

$(Si_2O_5)_2Mg_3(OH)_2$, $Si_8Mg_6O_{20}(OH)_4$, or $Mg_{12}Si_{16}O_{40}(OH)_8$, disregarding impurities, which can include inorganics such as carbonates, other magnesium silicates, ferrous iron compounds and various organic materials. Such impurities generally occur in minute amounts, but can occur in major amounts as well; certain talcs, for example, can contain major amounts of dolomite or tremolite. The impurities found in talcs will vary as to type and amount depending on the geographic source of the talc. Even in minute amounts, however, impurities may exert a significant influence on a talc's in-use performance as a filler for thermoplastic molded articles.

Talc, being naturally organophilic, is highly compatible with and is easily wet by organic resins. Thus, it has come into widespread use as a filler in thermoplastic resinous compositions, including those containing polyolefins such as polyethylene, polypropylene and the like. Because of talc's thin platelet structure when finely ground, it is considered a reinforcing filler rather than an extender. Non-platy particulate mineral fillers such as calcium carbonate, on the other hand, are primarily extenders rather than reinforcing fillers. Polypropylene reinforced with talc, in particular, is widely used in appliance applications, where the color of the filled, molded resin is a major concern, and in automotive applications, especially under-the-hood automotive applications, where color is not a particular concern but increased stiffness, dimensional stability and resistance to heat distortion are of primary importance. Plastics producers prefer a talc filler which does not discolor at typical molding temperatures, particularly where the product will be decorative in nature, and which affords adequate impact strength and other tensile properties, and adequate long-term heat stability, to the molded plastic.

Two characteristics of a talc—its particle size distribution and its crude ore source—have been said to affect the properties of talc-filled polypropylene molded articles. Tests have shown that talc particle size distribution affects the stiffness or flexural modulus and tensile yield of a polypropylene molded article, with tensile yield being most affected when the talc filler's cumulative mean particle size is less than 7 μm. Flexural modulus, on the other hand, has been shown to vary inversely with talc particle size. To further complicate the picture it has also been found that better long-term heat stability is generally realized with increased talc particle sizes; see Bragg et al., *Plastics Engineering*, Vol. 30, No. 9, pp. 30–32 (September 1974).

The apparent particle size distribution in talc from any geographic source, as measured by typical gravimetric particle size distribution methods, can be made comparable to that of talc from any other source by grinding. However, matching the aspect ratio of talc from one geographic source by grinding talc from another geographic source which has a different aspect ratio cannot easily be accomplished. Geographic source itself—or more particularly the different kinds and amounts of impurities present in talcs from different geographic sources—raises another problem which is not so easily solved. Talcs from certain geographic sources, such as Montana (Yellowstone and Beaverhead talcs, for example) and certain Australian talcs, have been found to be inferior to those from other sources, particularly California, as fillers for polypropylene. Bragg et al have shown, for example, that Montana talc-filled polypropylene is poorer in heat stability than California talc-filled polypropylene when treated at 365° F. for 16 hours, no matter what the particle size, coarse or fine, of the talc used, and that to obtain equal long-term heat aging performance, a higher overall heat stabilizer level must be used in Montana talc-filled polypropylene than in California talc-filled polypropylene.

A comparison of the chemical composition of theoretical and typical commercial talcs is given in Radosta, *Plastics Compounding*, September/October 1979, pp. 23, 24, 26–28 and 30, at page 24 (Table I):

|  | Theoretical pure talc | Montana talc | California talc | Vermont talc |
| --- | --- | --- | --- | --- |
| $SiO_2$ % | 63.5 | 62.5 | 57.4 | 56.2 |
| MgO, % | 31.7 | 30.6 | 27.6 | 30.8 |
| CaO, % |  | 0.3 | 6.2 | 0.4 |
| $Al_2O_3$, % | 0.5 | 1.4 | 0.5 |  |
| $Fe_2O_3$, % |  | 0.7 | 0.3 | 3.9 |
| Loss on ignition, % | 4.8 | 5.4 | 7.1 | 8.2 |

Mathur et al., in *Society of Plastics Engineers Technical Papers*, Vol. 25, pp. 663–667 (1979) reported on their studies of the deterioration of oven aging characteristics in heat-stabilized polypropylene moldings filled with certain high aspect ratio talcs. These authors found that "(t)he melt compounding of Montana talcs as well as Vermont talcs results in significant discoloration of molded parts, while California talcs do not discolor the matrix." No loss of mechanical properties, however, was seen to be associated with this discoloration. Mathur et al. also found that while "(t)he primary source for polypropylene coloration by Montana and Vermont talcs is not well understood, . . . it can be minimized by the use of . . . processing aids, such as calcium stearate, carbowax and amide processing lubricants."

U.S. Pat. No. 3,553,158, issued Jan. 5, 1971 to Gilfillan and mentioned in the Mathur et al. article, discloses heat-stabilized, talc-filled polypropylene molding resin compositions containing a "talc deactivating" organic polar compound, preferably an epoxide (particularly a polyepoxide), an amide, an acrylate polymer or an aliphatic polyol. According to Gilfillan, such compounds generally "... will have a molecular weight greater than about 300; will contain one or more polar groups such as epoxide, aliphatic hydroxyl, ester, amide, ether or sulfide; and will preferably contain a non-polar organic group which makes them at least moderately compatible with the polymer, such as lauryl or stearyl";

see column 7, lines 41–58 in the Gilfillan patent. Carbowax 400 and Carbowax 6000 are specifically disclosed as "talc deactivating" compounds in Gilfillan's Table I, the talcs treated in the working examples were Montana talcs, and calcium stearate was included in the compositions of at least working examples 1–3.

Shimizu et al., in Japanese Kokai 75 8,098, published April 2, 1975 [Chem. Abst. 83: 98595j (1975)] disclose increasing the discoloration resistance of polypropylene homopolymer and copolymer molding compositions containing talc by adding thereto, as a "reforming agent", a polyalkylene glycol alkyl ether or polyalkylene glycol alkylphenyl ether such as a "polyalkylene glycol phenoxyether", polyethyleneglycol octylphenyl ether, polyethyleneglycol lauryl ether or polyethylene glycol/polypropylene glycol ether.

Other publications which disclose treating talc or talc-containing thermoplastic resinous compositions to improve the properties of thermoplastic resinous molded articles made from them include the following:

U.S. Pat. No. 4,116,897, issued Sept. 26, 1978 to Huszar et al., which discloses polyolefin molding compositions containing talc and a mixture of two surfactants— one of which can be alkylphenyl polyether—having different HLB values; see column 3, lines 1–17 and 67 and column 4, line 17.

Talc filler coated with at least one metallic salt of an 8–20 carbon atom-containing fatty acid, e.g., calcium stearate, is disclosed in U.S. Pat. No. 4,255,303, issued Mar. 10, 1981 to Keogh; see column 4, lines 13–32.

Mineral fillers such as talc coated with a thin layer of liquid ethylene oxide oligomer having a molecular weight of from 100–800 are shown in U.S. Pat. No. 4,411,704, issued Oct. 25, 1983 to Galeski et al.; see column 2, lines 11–20 and 23.

Transparent polypropylene food packaging materials which are easily incinerated after use and which contain talc, a polyol ester such as polyethyleneglycol monostearate or glycerol distearate, and antioxidants and stabilizers, included among which is epoxidized soybean oil, are shown in Tsunetsugu et al. Japanese Kokai 75 109,239, published August 28, 1975 [Chem. Abst. 83: 207145k (1975)].

Rusznak et al., Muanyag Gumi, Vol. 16, No. 9, pp. 257–261 [Hung. 1979; Chem. Abst. 92: 42775m (1980)] discloses isotactic polypropylene compositions containing talc, a surfactant and an "elastomeric adhesion improver".

Talc-filled polypropylene molding compositions containing oleic amide as a processing aid together with BHT (butylated hydroxytoluene, an antioxidant) are taught in Tokuyama Soda's Japanese Kokai 80 142,039, published Nov. 6 1980 [Chem. Abst. 94: 122583d (1981)].

The treatment of talc with solid resins, such as hydrogenated petroleum resin, wax (e.g., stearic acid) or a combination of such substances to improve the talc's compatibility with polyolefins is shown in Matsumoto et al. Japanese Kokai 78 65,346, published June 10, 1978 [Chem. Abst. 89: 147656q (1978)].

Goel et al., Polym. Eng. Sci., Vol. 20, No. 3, pp. 198–201 (1980) [Chem. Abst. 92: 129772g (1980)], disclose adding small amounts of oligomeric polypropylene oxide to talc-filled isotactic polypropylene to decrease both viscosity and elasticity.

A 1978 Research Disclosure, Vol. 173, No. 19 [Chem. Abst. 89: 180758x (1978)] teaches that low melting cellulose acetate butyrate is a good heat stabilizer for talc-filled polypropylene.

It has now been discovered that Montana talc and like talcs regarded, in the unbeneficiated state, as inferior fillers for thermoplastic resinous compositions, and particularly polypropylene molding resins, because they discolor the resinous matrix when subjected to typical molding conditions and adversely affect its long-term heat stability, can be rendered suitable for this use, at low cost, by treatment with novel combinations of particular amounts of certain materials. Thermoplastic resinous molded articles containing the thus-treated talcs exhibit significantly reduced darkening was measured by the General Electric brightness test), without unacceptably increased yellowing (as measured by the Hunterlab yellowness index), and improved heat stability (as measured by oven aging) when compared to molded articles containing the corresponding untreated talc.

It is therefore an object of this invention to provide novel, improved, low cost beneficiated talcs and compositions which provide such beneficiation.

A further object of this invention is to provide low cost means for improving the performance characteristics of talcs hitherto considered unsuitable per se as fillers for thermoplastic resinous compositions.

A still further object of this invention is to provide thermoplastic resinous compositions filled with incompatible or unsuitable talcs, such as Montana talc and like talcs, which have been improved in accordance with the invention so that articles molded therefrom exhibit physical properties, such as color, impact strength and other tensile properties, and long-term heat stability, comparable to those found in molded articles filled with "superior" talcs.

Another object of this invention is to provide talcs which have been beneficiated at low cost and which, when incorporated as fillers in thermoplastic molded articles, result in such articles exhibiting significantly reduced darkening, without unacceptably increased yellowing, comparable tensile properties and improved heat stability when compared to molded articles containing unbeneficiated talc.

These and other objects, as well as the nature, scope and utilization of this invention, will become readily apparent to those skilled in the art from the following description, the drawings and the appended claims.

SUMMARY OF THE INVENTION

It has now been discovered that an effective amount of a combination of:

(A) one or a mixture of octyl-or nonylphenol/-poly(ethylene oxide) condensates, and (B) one or a mixture of poly(ethylene glycols) or alkoxypoly (ethylene glycols),
applied to a talc which is capable of being beneficiated by such combinations or included in thermoplastic resinous compositions filled with such talcs, will render talcs such as Montana talc and like talcs hitherto regarded as incompatible or unsuitable fillers for thermoplastic resinous compositions, and particularly polypropylene molding resins, suitable for this use and comparable in their in-use performance to talcs, such as California talc, regarded as superior fillers.

Such additive combinations do not cause unpleasant odors in talc-filled molding resins containing them, and indeed improve the odor of such resins as compared to the corresponding unbeneficiated talc-containing resinous compositions. These additive combinations are also of a relatively low order of toxicity, and hence do not prevent the beneficiated talc-containing resinous compositions of this invention from being used to prepare molded articles which can come in contact with foods, e.g. microwave oven and refrigerator liners.

I do not wish to be bound by any particular mechanism or theory advanced to explain the mode of operation of these novel combinations of materials in rendering incompatible or unsuitable talcs suitable as reinforcing fillers for thermoplastic resins. One possibility, nonetheless, is that certain talcs which contain appreciable amounts of ferrous iron compounds, other transition metal impurities or other substances which, if present in the talc crystallites in a molecular configuration such that active sites are formed on the talc surface, which sites, e.g., Lewis acid sites, are capable of exchanging charge with the polymer's molecular structure, may act as catalysts for reactions which cause deterioration in color and long-term heat stability in thermoplastic matrixes.

These highly charged sites, however, may also act as ligands or coordination complex formers with materials having sufficiently high charge densities, such as those employed as beneficiating agents in practicing the present invention, to share and thus immobilize the charge. If such beneficiating agents complex with or occlude these areas of high charge, they may mask the talc's degradative catalytic activity. Such behavior may perhaps be analogous to that of the organic base catalyst poisons chemisorbed on the surfaces of non-metallic alumina, silica and silica-alumina cracking catalysts discussed at pp. 9-12 of Hughes, "Deactivation of Catalysts" (New York: Academic Press, 1984).

Interestingly, ethylene glycol, a compound which does not possess high charge density but which, however, is a highly polar organic compound, does not beneficiate incompatible or unsuitable talcs to suppress their deteriorative properties to anything like the same extent as do the novel combinations of materials of this invention.

Another conceivable explanation of why this invention gives the results it does involves the possibility that incompatible or unsuitable talcs behave as they do because they contain small but nonetheless significant amounts of organic impurities which, over the millenia, leached into the deposits from which these talcs were mined. If such impurities do contribute to color deterioration and loss of long-term heat stability, the novel combinations of this invention perhaps act to prevent such impurities themselves from degrading, or to prevent them from reacting with the matrix during melt extrusion and molding.

BRIEF DESCRIPTION OF THE DRAWINGS

FIG. 2 is a graph of certain Performance (Acceptability) Index figures calculated for polypropylene molding resins filled with Montana Yellowstone talc treated with mixtures of Triton X-114 octylphenol/poly(ethylene oxide) condensate and Carbowax 200 poly(ethylene glycol).

FIG. 3 is a graph showing as-molded brightness vs. titanium dioxide concentration, prepared by plotting parts per hundred parts of resin (polypropylene plus beneficiated or unbeneficiated talc filler) against titanium dioxide concentration, for certain polypropylene molding resins filled either with Montana Yellowstone talc beneficiated in accordance with this invention [Examples 6 (control), 96, 97 and 98 hereinbelow] or with untreated Panamint talc [Examples 103 (control), 104, 105 and 106 hereinbelow], a "superior" talc.

FIG. 4 is a particle size distribution curve for the Montana Yellowstone talc used as the filler in the polypropylene molding resin of Example 54.

FIG. 5 is a particle size distribution curve for the Montana Yellowstone talc used as the filler in the polypropylene molding resin of Example 55.

DETAILED DESCRIPTION OF THE INVENTION

Figure 1:
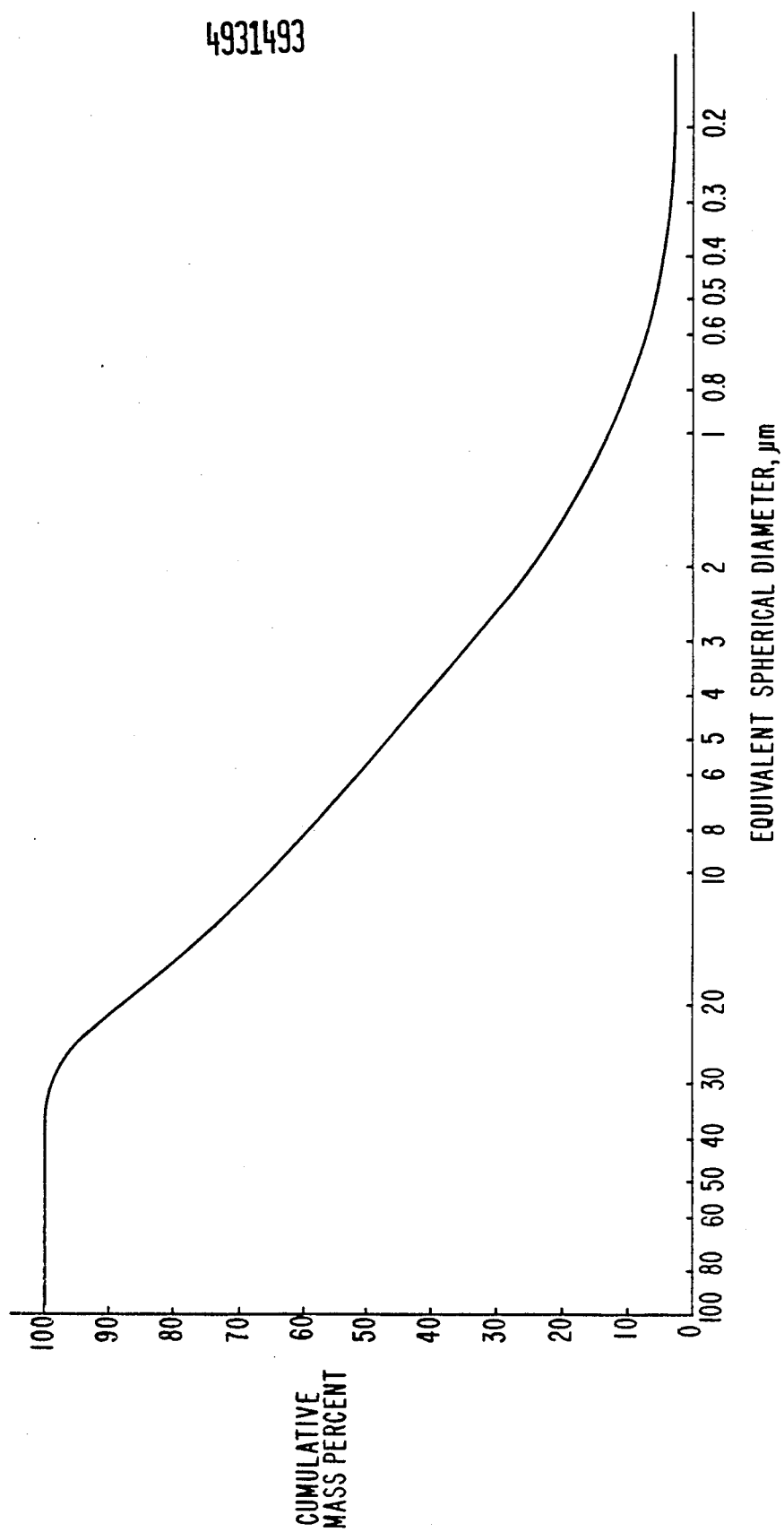
FIG. 1 is a particle size distribution curve for the Montana Yellowstone talc used as the filler in the polypropylene molding resins of Examples 1-16 and 21-44 hereinbelow.

The octyl- or nonylphenol/poly(ethylene oxide) condensates employed in practicing this invention can be represented by the general formula:

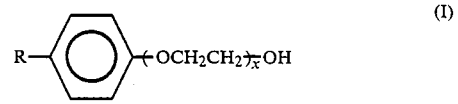

(I)

wherein R represents one or a mixture of $C_8$ or $C_9$ alkyl groups, preferably branched-chain isomers such as an isooctyl group,

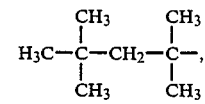

and x is a number of from about 3 to about 40, indicating the average number of ethylene oxide units in the ether side chain. Members of the octylphenol and nonylphenol series of nonionic surfactants sold by Rohm and Haas Company under the trademark Triton can be used in practicing this invention, and Triton X-114 surfactant, an octylphenol/poly(ethylene oxide) condensate having, on average, 7-8 ethylene oxide units in the ether side chain, is particularly preferred.

The poly(ethylene glycols) and alkoxypoly(ethylene glycols) which can be used in practicing the present invention can be represented by the general formula:

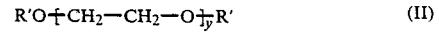

(II)

wherein R' represents hydrogen or a lower alkyl group having from 1-4 carbon atoms, inclusive, preferably methyl or ethyl, and y is a number such that the average molecular weight of the poly(ethylene glycol) or alkoxypoly(ethylene glycol) is from about 100 to about 20,000, and preferably from about 200 to about 14,000.

Members of the series of poly(ethylene glycols) and alkoxypoly(ethylene glycols) sold by Union Carbide Corporation under the trademark Carbowax can be used in practicing this invention; Carbowax polyethylene glycol 200 (y=about 4) and Carbowax polyethylene glycol 300 (y=about 6) which are liquids at room temperature, are particularly preferred. Higher molecular weight solid members of this series can, of course, be used, but are somewhat more difficult to work with.

Ordinarily, in practicing this invention an effective, beneficiating amount of a combination of one or a mixture of the octyl- or nonylphenol/poly(ethylene oxide) condensates and one or a mixture of the poly(ethylene glycols) or alkoxypoly(ethylene glycols) will be used, i.e., an amount sufficient to beneficiate or upgrade the in-use performance of an incompatible or unsuitable talc (one which, prior to beneficiation, does not furnish the property levels set out immediately hereinbelow) when used as a reinforcing filler in articles molded from commercially available, heat-stabilized polypropylene resins. Beneficiation in the manner taught by this invention will upgrade a hitherto incompatible or unsuitable talc's performance to the point at which the molded article, at 40 weight percent filler loading, exhibits improvement in both brightness (GE brightness, measured in the manner described below or in an equivalent manner) and oven life upon aging at 155° C., together with improvement or at least no unacceptable diminution in other significant physical properties, particularly yellowness index, flexural modulus and impact strength. In general, such a molded article will exhibit a GE brightness of at least about 20% and withstand oven aging at 155° C. in an atmosphere of air for at least 10 days. Preferably, its Hunterlab yellowness index will be no more than about 20 (although higher yellowness indices can be tolerated when molded articles having "warmer" colors are desired), its flexural modulus will be at least about 270 ksi and its Gardner impact strength will be at least about 6 ft.-lbs./in.

An effective amount of a beneficiating composition of this invention which will provide the aforementioned levels of property improvement, and particularly acceptable brightness coupled with acceptable oven life at 155° C., to a talc regarded, in the unbeneficiated state, as incompatible or unsuitable for use as a filler for thermoplastic resinous compositions, and particularly polypropylene molding resins, usually will range from about 0.05% to about 4.0% by weight, and preferably from about 0.2% to about 1.50% by weight, of one or a mixture of the octyl- or nonylphenol/poly(ethylene oxide) condensates, and from about 0.05% to about 4.0% by weight, and preferably from about 0.2% to about 1.50% by weight, of one or a mixture of the poly(ethylene glycols) or alkoxypoly(ethylene glycols). The total amount of octyl- or nonylphenol/poly (ethylene oxide condensate(s) and poly[ethylene glycol(s)] or alkoxypoly [ethylene (glycols)] combined ordinarily will be no more than about 5.0% by weight, and preferably no more than about 3% by weight. The aforementioned weight percents are each based on the weight of the unbeneficiated talc being treated.

These beneficiating materials can be mixed with the talc before adding it to the remaining ingredients of the molding composition, and indeed before grinding the talc, if desired, or they can be mixed with these ingredients and the talc in any other desired order, either before or while talc is compounded with the remaining components of the molding resin composition (e.g., they can be added to the blender or to the melt in an extruder from which molding resin pellets are obtained). When these materials are mixed with the talc itself, they may be added to the talc directly or first dissolved in a suitable organic solvent, preferably a polar solvent such as a lower alkanol, e.g., ethanol or isopropanol, a ketone such as acetone, methyl ethyl ketone or methyl isobutyl ketone, a low molecular weight Cellosolve, e.g., 2-butoxyethanol, and the like, or mixtures thereof, then added to the talc, e.g., by spraying or wet blending, and the solvent evaporated.

Treated talcs can be prepared in a Henschel or similar blender or the like which can be used to mix and blend the ingredients to macrohomogeniety, i.e., to less than complete uniformity, particularly when a relatively small sample is considered, or to greater uniformity if desired, at any temperature up to the decomposition point of the most easily decomposable component. The treated talcs can be compounded with the resin using a Leistritz compounder-extruder or other suitable device.

Molding compositions containing the treated talcs of this invention, particularly, those compositions used to provide molded articles intended for use in elevated temperature environments, can also contain conventionally-employed types and amounts of other additives: primary antioxidants (heat-stabilizers) including hindered phenols such as:

1,3,5,-tris(4-tert-butyl-3-hydroxy-2,6-dimethylbenzyl)-1,3,5-triazine-2,4,6,(1H,3H,5H)-trione,
1,3,5,-trimethyl-2,4,6,-tris[3,5-di-tert-butyl-4-hydroxybenzyl]benzene,
2,6,-di-tert-butyl-4-methylphenol,
tetrakis[methylene(3,5,-di-tert-butyl-4-hydroxycinnamate)]methane,
N-N'-hexamethylenebis(3,5,-di-tert-butyl-4-hydroxyhydrocinnamamide),
O,O-di-n-octadecyl-3,5,-di-tert-butyl-4-hydroxy benzyl phosphonate,
2,4-bis(n-octylthio)-6-(4-hydroxy-3,5-di-tertbutylanilino)-1,3,5-triazine,
thiodiethylenebis(3,5,-tert-butyl-4 hydroxy) hydrocinnamate,
octadecyl 3,5-di-tert-butyl-4-hydroxyhydrocinnamate,
tris(3,5-di-tert-butyl-4-hydroxybenzyl)isocyanurate,
1,1,3,-tris (5-tert-butyl-1,4-hydroxy-2-methylphenyl) butane, and the like, esters such as octadecyl-3(3,5-di-tert-butyl-4hydroxyphenyl) propionate, pentaerythritol tetra-[3-(3,5-di-tert-butyl-4-hydroxyphenyl) propionate], and the like, secondary stabilizers, e.g., dialkylthiodipropionates such as distearylthiodipropionate, dilaurylthiodipropionate, epoxides, and the like, extenders such as calcium carbonate, pigments, e.g., carbon black and titanium dioxide, dyes, mold lubricants, e.g., calcium stearate, other reinforcing agents, e.g., fibrous reinforcing agents such as glass fiber, carbon or carbon/graphite fibers, and the like.

Besides polypropylene molding resins, any other thermoplastic materials fillable with talc or other reinforcing fillers, including other polyolefin homopolymers, copolymers and mixtures containing them, polyesters such as polyethylene terephthalate, poly(1,4-butanediol)terephthalate, and the like, all-aromatic polyesters, e.g., aromatic diacid/aromatic diol/±hydroxy aromatic acid copolymers, polycarbonates, polyoxymethylene homo- and copolymers, e.g., acid anhydride end-capped oxymethylene homopolymers and trioxane/ethylene oxide copolymers, ABS, SBR, EPDM and neoprene rubbers, polyisoprene, and the like can be filled with the beneficiated talcs of this invention, using art-recognized techniques.

The beneficiated talcs of the present invention can be used as fillers in thermoplastic resinous compositions in the amounts in which talc has hitherto been used for this purpose. Typical filler loadings can range from about 10% to about 50% by weight, and preferably from about 15% to about 30% by weight, or from about 35% to about 50% by weight, based on the total weight of the filled composition. Amounts of the beneficiated talcs of this invention within these ranges will be used, for example, when polypropylene is the resin being filled.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLES 1-44

A single batch of 'Beaverwhite 325' Montana Yellowstone talc (Cyprus Industrial Minerals Company) having a median particle size of approximately 6 μm and a particle size distribution such that 80% of the particles are finer than about 16 μm and 20% of them are finer than about 1.6 μm: see FIG. 1, was used in each of these examples except Examples 17-20; see note 9. In each example except for the controls in which no additive was used, a sample of talc treated with the amount and type of additive(s) listed in Table 1 below was mixed with polypropylene resin at a temperature ranging from 325°-430° F. in a Leistritz compounder-extruder.

Araldite polyepoxide, 0.06 weight percent based on compound weight, i.e., on the weight of all the other components, was added to promote oxidation resistance to the polypropylene matrix in Examples 1, 3-16 and 21-40.

In the case of Examples 7-21, 26 and 28-44, the talc used was dried at 110° C. in a ventilated, circulating air oven for periods ranging from 6 hours to overnight to reduce its moisture content.

The additive(s) was applied to the talc in solution in isopropyl alcohol, except where otherwise noted. The alcohol was then evaporated at 85° C. in the case of Examples 1-7 and 26-29. This was later found to be unnecessary.

The extruded resin pellets produced from the filled polypropylene compositions of Examples 1-4,6,21-26 and 29 were dried at 105° C. for 2 hours, then tumbled together for 5 minutes prior to being injection molded, the thought being that this would effect better homogeniety. This was, however, found to produce no discernible improvement, and was ultimately discontinued.

Each talc sample, treated and untreated, was then mixed with Amoco 1046 polypropylene, an antioxidant-containing resin, in amounts sufficient to give, in each case, a resin batch having a talc content of 40%, based on the total weight of the batch. Each batch was then used to prepare, by melting at a temperature of 360°-435° F., using an Arburg injection molding machine, and then molding at 140° F. for 56 seconds, sufficient quantities of discs and tensile bars conforming to ASTM and other applicable standards, to permit testing according to ASTM standards, variations thereof, and other test methods as described hereinbelow.

The following tests were performed on these molded discs or bars from each talc sample:

1. Oven Aging a procedure used to evaluate the relative thermal stabilities of the injection molded polypropylene specimens.

One tensile bar and one disc of each material tested were placed on the stainless steel grills of a forced-air circulation oven (Despatch Oven Company; Serial No. 9376-3L) at 155° C. (measured by the oven's outside indicator and a temperature dial gauge placed inside the oven) and the starting time (day and time specimens were placed in the oven) was noted. The oven grills were shifted once daily (except on weekends) in a pattern which insured uniform air exposure.

The specimens were inspected once a day (except on weekends), and a specimen was considered to have failed when approximately 10% of its surface showed "crazing" (surface cracks or deterioration), embrittlement or serious discoloration. The oven temperature as indicated inside and outside the oven was recorded at this time, as was the inspection time (in clock hours from the start of the test) and any observed failures. The oven life of a sample was expressed in days to failure.

2. GE Brightness a procedure used to determine the brightness of the injection molded polypropylene specimens.

A minumum of three (and preferably five) specimen discs were evaluated for each material tested. After first making certain that the filter wheel of a Technidyne brightimeter, Model S-4, was in position 1 and centered, the instrument was turned on and its calibration checked by placing an opal glass standard block over the sample opening and then adjusting the "Cal Adjust" knobs on the front of the instrument so that the instrument read the brightness value indicated on the standard. The calibration was rechecked in this fashion every few minutes while the instrument was in actual use.

A specimen disk was then set over the sample opening and a 1 kg brass weight placed on top of the sample. The digital panel meter settled on a reading in 1-2 seconds:
  if the last digit of this reading oscillated between two numbers, the one which predominated was chosen;
  if neither number predominated, the lower digit was chosen.

The instrument's "Enter" knob was then pressed to print the reading by means of a Canon printer, Model cp 1002.

This procedure was then repeated:
  to obtain readings from three different surface spots on each disc;
  to obtain readings for 3-5 discs representing each material tested.

After each 9-15 readings, the "Average" knob was pressed to obtain the average of the readings for each sample.

3. Hunterlab Yellowness Index Tests a procedure for determining the yellowness of the injection molded polypropylene specimens.

A minimum of three specimen discs were evaluated for each material tested. The Hunterlab model D25-9 Colorimeter was standardized before each series of tests by:

- placing the standby/operate switch in the "Up" position, returning on the instrument and letting it run for twenty minutes,
- then turning the key to the "Standardize" position,
- placing the black glass in the sample port with the shiny side up,
- setting the Tappi filter in the "Out" position,
- pressing the "Zero" (not "O") key; "Zero Stored" was displayed on the processor, removing the black glass,
- pressing the "XYZ" key,
- pressing in sequence "Recall", "Inst. STD" and "0"; the "XYZ" values for the calibrated white tile were displayed on the processor,
- placing the calibrated white tile in the specimen port, pressing "STDZ".

Next, the program for computing the average of the yellowness index for each sample was entered, the key turned to the "Operation" position, and "Alt Mode" and "Run" pressed to insure that the computation of the average yellowness index was programmed. The white tile was then removed and a specimen disc placed in the specimen port. "Run" was then pressed and the "WI" and "YI" readings printed. This sequence was then repeated:

- to obtain the yellowness index reading from three different surface spots on each disc:
- to obtain readings for three discs representing each material tested. The over-all average of the yellowness index for each sample was then calculated manually.

4. Flexural Modulus

ASTM D-790.

5. Gardner Impact Test a procedure for determining the energy required for a falling weight applied under specified conditions to crack or break the injection molded polypropylene specimens.

A minimum of twenty specimen discs, allowed to age under ambient lab conditions for a minimum of 7 days before testing, were impacted for each material tested. Next, using a micrometer, the average nominal thickness of these discs was determined.

A specimen disc was then positioned, with the knockout pin marks facing up, over the support anvil of a Gardner Laboratories Model IG-1120 Variable Height Impact Tester having cylindrical 2, 4 and 8 lb. weights which can be dropped through a vertical guide tube for distances of up to about 1 meter (40 inches). The tip of the instrument's impactor was positioned to rest at the center point on the disc.

A 2 lb. weight was raised to the desired height and released. This allowed the weight to fall freely and strike the impact plunger. After impact, the disc was removed and the impacted area visually inspected for failure. Failure is defined as any of the following conditions:

- the disc was broken to pieces;
- the center area protruded on the disc surface opposite the one having the knockout pin marks;
- if neither of these conditions obtained, the disc was bent by hand and then visually reexamined for cracks on the surface opposite the one having the knockout pin marks; if cracks occurred, and the depth of any one of them was more than one-third the thickness of the disc, this was considered a failure.

The starting point for the staircase (up and down) method was determined on several impacts by halving or doubling the drop height until a pass-fail point was determined. The next specimen was impacted using the drop height corresponding to the pass-fail point determined in this manner. If the specimen passed, the next specimen was tested at a drop height one inch higher. If the specimen failed, the next specimen was impacted at a drop height one inch lower. This procedure was continued until twenty specimens were tested, with a running record being kept of failures and non-failures.

---

Calculations $$h = h_o + d(A/N) \pm 0.5D$$

Where:
- $h$ = mean failure height, in.
- $d$ = increment of height, in (= 1 in.)
- $N$ = total number of failures or non-failures (events), whichever was smaller. If they were equal, failures were used.
- $h_o$ = lowest height at which an event occurred, in.

$$A = \sum_{i=0}^{K} i n_i$$

- $i$ = 0,1,2 - K (counting index, 0 starts at $h_o$)
- $n_i$ = number of events occurring at $h_i$
- $h_i = h_o + id$
- $h_k$ = largest height at which an event occurred, in.
- $\pm$ = for failures − was used; for non-failures + was used.

$$MFE = hWf$$

Where:
- MFE = mean failure energy (50% failure), joules or inch-pounds
- $h$ = mean failure height, in.
- $W$ = weight, lb.
- $f$ = factor for conversion to joules
  = 1.0 to get US units (in.-lbs.) if $h$ = in. and $W$ = lbs.

$$S = \left[ 1.620\, d \left( \frac{NB - A^2}{N^2} + 0.029 \right) \right] w$$

Where:
- $S$ = estimated standard deviation $$B = \sum_{i=0}^{K} i^2 n_i$$

6. Heat Deflection Temperature - ASTM D648 (66 psi).

7. Melt Index - ASTM D-1238.

---

The results of these tests are set out in Table I below. In this and all subsequent tables the notation "wt. %" in the "Additive(s)" columns is a close approximation of actual weight percents used. The actual additive editions were made based on parts of additive(s) added per hundred parts of talc filler.

TABLE I

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 1 | 0.42 wt. % Triton X-114<br>0.42 wt. % Carbowax 200 | 13 | 26.01 | 16.3 | 442 | 7.2 | — | 8.8 |
| 2 | 0.42 wt. % Triton X-114<br>0.42 wt. % Carbowax 200 | 14 | 24.13 | 16.3 | 452 | 9.8 | 265 | 10.1 |
| 3 | 0.59 wt. % Triton X-114<br>0.20 wt. % Carbowax 200 | 19 | 25.57 | 15.8 | 430 | 8.5 | — | 11.0 |
| 4 | 0.21 wt. % Triton X-114<br>0.70 wt. % Carbowax 200 | 15 | 26.46 | 16.4 | 417 | 8.7 | — | 10.2 |
| 5 | 0.63 wt. % Triton X-114<br>0.63 wt. % Carbowax 200 | 18 | 27.39 | 13.9 | 458 | 8.9 | — | 7.6 |
| 6 | 0.88 wt. % Triton X-114<br>0.30 wt. % Carbowax 200 | 19 | 27.13 | 14.5 | 448 | 10.9 | 277 | 8.8 |
| 7 | 0.28 wt. % Triton X-114<br>1.10 wt. % Carbowax 200 | 16 | 28.13 | 14.9 | 464 | 11.6 | 261 | — |
| 8(8) | 0.42 wt. % Triton X-114<br>1.40 wt. % Carbowax 200 | 13 | 29.2 | — | 399 | — | — | — |
| 9(8) | 0.84 wt. % triton X-114<br>0.84 wt. % Carbowax 200 | 17;fdw | 26.7 | — | 413 | 9.9 | — | — |
| 10(8) | 0.87 wt. % Triton X-114<br>0.31 wt. % Carbowax 200 | 17;fdw | 26.3 | — | 450 | 10.6 | — | — |
| 11(8) | 1.16 wt. % Triton X-114<br>0.42 wt. % Carbowax 200 | 20;fdw | 27.6 | — | 403 | 6.9 | — | — |
| 12(8) | 0.63 wt. % Triton X-114<br>0.63 wt. % Carbowax 200 | 16;fdw | 26.3 | — | 460 | — | — | — |
| 13(8) | 0.58 wt. % Triton X-114<br>0.21 wt. % Carbowax 200 | 16;fdw | 25.6 | — | 475 | 6.9 | — | — |
| 14(8) | 0.42 wt. % Triton X-114<br>0.42 wt. % Carbowax 200 | 15;fdw | 25.2 | — | 458 | — | — | — |
| 15(8) | 0.32 wt. % Triton X-114<br>1.06 wt. % Carbowax 200 | 15;fdw | 28.2 | — | 449 | — | — | — |
| 16(8) | 0.21 wt. % Triton X-114<br>0.70 wt. % Carbowax 200 | 14;fdw | 26.0 | — | 467 | — | — | — |
| 17(8,9) | 0.42 wt. % Triton X-114<br>0.42 wt. % Carbowax 200 | 10 | 20.4 | — | 434 | 10.8 | 270 | — |
| 18(8) | 0.42 wt. % Triton X-114<br>0.42 wt. % Carbowax 200 | 13;fdw | 23.2 | — | 470 | 12.4 | 272 | — |
| 19(8,9) | 0.88 wt. % Triton X-114<br>0.30 wt. % Carbowax 200 | 11;fdw | 21.9 | — | 420 | 12.8 | 264 | — |
| 20(8) | 0.88 wt. % Triton X-114<br>0.30 wt. % Carbowax 200 | 13 | 25.4 | — | 428 | 11.3 | 264 | 7.9 |
| 21(8,10) | None | 1 | 10.9 | 10.1 | 467 | 11.5 | 269 | 5.2 |
| 22(8,11) | 2.0 wt. % Carbowax 200 | 14 | 29.2 | 15.2 | 454 | 12.5 | 264 | 11.0 |
| 23(8,11) | 7.5 wt. % CaCO₃<br>0.5 wt. % Carbowax 200 | 14 | 26.1 | 16.5 | 437 | 8.0 | — | — |
| 24(8,11) | 0.98 wt. % Carbowax 200 | 11 | 27.7 | 16.9 | 472 | 8.2 | — | — |
| 25(8,11) | 0.74 wt. % Triton X-114 | 14 | 24.5 | 15.3 | 495 | 9.1 | — | 10.0 |
| 26(11) | 1.16 wt. % triethanolamine | 9 | 25.2 | 38.3 | 470 | 7.6 | — | 10.0 |
| 27(11) | 1.1 wt. % Triton X-114 | 19 | 26.1 | 14.1 | 490 | 8.1 | — | — |
| 28(11) | 1.47 wt. % Carbowax 200 | 13 | 27.5 | 14.8 | 467 | 9.9 | — | 7.9 |
| 29(11) | 0.53 wt. % triethanolamine<br>0.50 wt. % Carbowax 200 | 14;fdw | 21.7 | 40.8 | 429 | 7.9 | — | — |
| 30(8,11) | 1.47 wt. % Triton X-114 | 19;fdw | 24.9 | — | 463 | 11.1 | — | — |
| 31(8,12) | 0.58 wt. % Vikoflex 7170<br>0.58 wt. % Triton X-114 | 18;fdw | 18.3 | — | — | — | — | — |
| 32(8,12) | 0.20 wt. % Vikoflex 7170<br>0.92 wt. % Triton X-114 | 18 | 19.6 | — | 479 | — | — | — |
| 33(8,12) | 0.39 wt. % Vikoflex 7170<br>0.75 wt. % Triton X-114 | 21;fdw | 18.9 | — | — | — | — | — |
| 34(8,12) | 0.21 wt. % Vikoflex 7170<br>1.21 wt. % Carbowax 200 | 16;fdw | 26.1 | — | 463 | — | — | — |
| 35(8,12) | 0.44 wt. % Vikoflex 7170<br>0.94 wt. % Carbowax 200 | 16;fdw | 24.2 | — | 438 | — | — | — |
| 36(8,12) | 0.67 wt. % Vikoflex 7170<br>0.67 wt. % Carbowax 200 | 17 | 22.9 | — | 460 | — | — | — |
| 37(8,12) | 0.25 wt. % Vikoflex 7170<br>0.22 wt. % Triton X-114<br>0.88 wt. % Carbowax 200 | 17;fdw | 25.2 | — | 454 | — | — | — |
| 38(8,12) | 0.40 wt. % Vikoflex 7170<br>0.37 wt. % Triton X-114<br>0.49 wt. % Carbowax 200 | 17;fdw | 24.1 | — | — | — | — | — |
| 39(8,12) | 0.25 wt. % Vikoflex 7170<br>0.66 wt. % Triton X-114<br>0.29 wt. % Carbowax 200 | 18 | 24.0 | — | 452 | — | — | — |
| 40(8,12) | 0.74 wt. % Vikoflex 7170<br>0.22 wt. % Triton X-114<br>0.29 wt. % Carbowax 200 | 17 | 20.8 | — | — | — | — | — |
| 41(8,9,10) | None | 12(13);fdw | 8.0 | — | 396 | 13.6 | 273 | — |
| 42(8) | 0.9 wt. % Triton X-114<br>0.1 wt. % Carbowax 200 | 13 | 24.5 | — | 450 | — | — | — |

TABLE I-continued

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 43[8] | 0.47 wt. % Triton X-114 0.47 wt. % Carbowax 200 | 12 | 25.3 | — | 413 | 11.9 | — | — |
| 44[8] | 0.42 wt. % Triton X-114 0.42 wt. % Carbowax 200 | 13;fdw | 23.2 | — | 429 | — | — | — |

(1) Days to failure; fdw=failed during weekend, hence, number of days to failure given may be one or two less than recorded.

The results of the tests performed on molded specimens of the thus-obtained molding resins are given in Table II below. Notes 1–7 are the same as for Table I.

TABLE II

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 45 | 0.88 wt. % Triton X-114 0.30 wt. % Carbowax 200 | 11 | 24.1 | — | 403 | 8.1 | — | — |
| 46 | 0.88 wt. % Triton X-114 0.30 wt. % Carbowax 200 | 11 | 23.9 | — | 421 | 10.0 | — | — |
| 47 | 0.42 wt. % Triton X-114 0.42 wt. % Carbowax 200 | 14;fdw | 24.8 | — | 406 | 10.3 | — | — |
| 48 | 0.42 wt. % Triton X-114 0.42 wt. % Carbowax 200 | 13;fdw | 24.1 | — | 425 | 10.0 | — | — |
| 49 | 0.88 wt. % Triton X-114 0.30 wt. % Carbowax 200 | 11 | 20.6 | — | — | 7.8 | — | — |

(2) Percent.
(3) Figure given is Index No. 1 (percent).
(4) $10^3$ psi.
(5) In ft./lb./in. of thickness
(6) In °F. at 66 psi fiber stress.
(7) In g/10 min.
(8) No solvent used.
(9) Classified using a centrifugal air classifier.
(10) Control example; no additive.
(11) Comparative example; one additive component only, or one additive component plus different additive, or different additive only, or both additive components plus a third ingredient.
(12) Epoxidized soybean oil; Viking Chemical Company.
(13) Oven temperature was 120° C.

EXAMPLES 45–49

The procedure of Examples 1–44 was repeated in every essential detail except for the following:
the talc used was from a single batch of "Beaverwhite 325" Montana Yellowstone talc (Cyprus Industrial Minerals Company) having a median particle size of approximately 5.6 μm and a particle size distribution such that 80% of the particles are finer than about 16 μm and 20% of the particles are finer than about 1.6 μm,
no Araldite polyepoxide was added in Examples 47 and 48.

EXAMPLES 50–53

The procedure of Examples 1–44 was again repeated in every essential detail except for the following:
the talc used was from a single batch of 'Beaverwhite 325' Montana Yellowstone talc having a median particle size of approximately 5.6 μm and a particle size distribution such that 80% of the particles are finer than 16μm and 20% of the particles are finer than 1.6 μm,
the talc samples used in Examples 50 and 52 were dried overnight at 110° C. to give a moisture content of 0.043%,
the talc sample used in Example 51 was undried, i.e., used as it came from the bag, and contained 0.43% moisture;
the talc sample used in Example 53 was humidified by exposure to moisture at room temperature overnight to give a moisture content of 0.80%,
no Araldite polyepoxide was added.

The results of the tests performed on molded specimens of the thus-obtained molding resins are given in Table III below. Notes 1–7 are the same as for Table I.

TABLE III

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 50 | 0.88 wt. % Triton X-114 0.30 wt. % Carbowax 200 | 12 | 24.3 | — | 439 | 8.5 | — | — |
| 51 | 0.88 wt. % Triton X-114 0.30 wt. % Carbowax 200 | 12 | 26.8 | — | 432 | 11.6 | — | — |
| 52 | 0.88 wt. % Triton X-114 0.30 wt. % Carbowax 200 | 12 | 24.8 | — | 403 | 7.5 | — | — |
| 53 | 0.88 wt. % Triton X-114 0.30 wt. % Carbowax 200 | 12 | 25.4 | — | 420 | 7.3 | — | — |

EXAMPLES 54–60

The procedure of Examples 1–44 was again repeated in every essential detail except for the following:

the talc used in Example 54 was from a single bag of Montana Yellowstone talc (Cyprus Industrial Minerals Company Grand Island facility); see FIG. 4, the talc used in Example 60 was from another bag of Montana Yellowstone talc from Cyprus's Grand Island facility; see FIG. 5, these talcs each have a median particle size of approximately 5.4 μm, 80% of the particles are finer than about 16–17 μm, 20% of them are finer than about 1 μm.

no Araldite polyepoxide was added.

The results of the tests performed on molded specimens of the thus-obtained molding resins are given in Table IV below. Notes 1–7 are the same as for Table I.

TABLE IV

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 54 | 0.74 wt. % Triton X-114 0.52 wt. % Carbowax 200 | 14 | 25.3 | — | 378 | 13.4 | 280 | 8.4 |
| 55 | 0.88 wt. % Triton X-114 0.30 wt. % Carbowax 300 | 14 | 25.9 | — | 431 | 9.1 | 262 | 7.6 |
| 56 | 1.03 wt. % Triton X-114 0.35 wt. % Carbowax 200 | 14 | 27.3 | — | 425 | 9.7 | 266 | 8.7 |
| 57 | 0.73 wt. % Triton X-114 0.25 wt. % Carbowax 200 | 12–13 | 24.7 | — | 446 | 7.0 | 252 | 7.6 |
| 58 | 0.81 wt. % Triton X-114 0.27 wt. % Carbowax 200 | 12–13 | 25.0 | — | 466 | 7.8 | 258 | 7.7 |
| 59 | 0.95 wt. % Triton X-114 0.33 wt. % Carbowax 200 | 14 | 25.7 | — | 453 | 9.2 | 257 | 7.7 |
| 60 | 0.95 wt. % Triton X-114 0.33 wt. % Carbowax 200 | 14 | 26.0 | — | 450 | 8.8 | 274 | 7.7 |

EXAMPLES 61–70

The procedure of Examples 1–44 was again repeated in every essential detail except for the following:

the talc was taken from the same batch of talc used in Examples 1–16 and 21–40, except for the classified talc, which was the same as that used in Examples 17 and 19, the resin used was Exxon 1063 polypropylene, a resin containing low amounts of antioxidant and heat stabilizer, no Araldite polyepoxide was added.

The results of the tests performed on molded specimens of the thus-obtained molding resins are given in Table V below. Notes 1–7, 9, 10 and 13 are the same as for Table I;

TABLE V

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 61 | 0.88 wt. % Triton X-114 0.30 wt. % Carbowax 200 | 3(13) | 31.9 | — | 421 | 11.0 | 256 | — |
| 62(9) | 0.88 wt. % Triton X-114 0.30 wt. % Carbowax 200 | 3(13) | 26.5 | — | 381 | 14.2 | 258 | — |
| 63 | 0.42 wt. % Triton X-114 0.42 wt. % Carbowax 200 | 3(13) | 31.8 | — | 416 | 10.9 | 253 | — |
| 64(9) | 0.42 wt. % Triton X-114 0.42 wt. % Carbowax 200 | 3(13) | 26.3 | — | 400 | 12.5 | 259 | — |
| 65(10) | None | 2(13) | 14.4 | — | 416 | 13.2 | 268 | — |
| 66(9,10) | None | 2(13) | 10.0 | — | 349 | 13.5 | 255 | — |
| 67 | 0.81 wt. % Triton X-114 0.27 wt. % Carbowax 200 | 3(13) | 31.7 | — | 416 | 13.2 | — | — |
| 68 | 0.95 wt. % Triton X-114 0.33 wt. % Carbowax 200 | 3(13) | 32.6 | — | 363 | 13.9 | — | — |
| 69 | 0.73 wt. % Triton X-114 0.25 wt. % Carbowax 200 | 3(13) | 31.3 | — | 384 | 13.7 | — | — |
| 70 | 1.03 wt. % Triton X-114 0.35 wt. % Carbowax 200 | — | 32.7 | — | 370 | 13.8 | — | — |

EXAMPLES 71–78

The procedure of Examples 1–44 was again repeated in every essential detail except for the following:

the talc used was from a batch of Mistron 600 Montana talc (Cyprus Industrial Minerals Company; median particle size 2.4.μm, of the particles are finer than about 6.2 μm, 20% of them are finer than about 0.65 μm), the Mistron 600 talc used in Examples 73–75 was classified, the Mistron 600 talc used in Example 73 was "fines" (median particle size about 1.2 μm; 80% of the particles are finer than about 1.9 μm, 20% of them are finer than 0.75 μm), the Mistron 600 talc used in Example 74 was "feed" (median particle size about 2.5 μm; 80% of the particles are finer than about 7 μm, 20% of them are finer than 0.9 μm), the Mistron 600 talc used in Example 75 was "coarse" (median particle size 4.4 μm, 80% of the particles are finer than 8.4 μm, 20% of them are finer than about the Mistron 600 talc used in Examples 76–78 was undried, Exxon 1063 polypropylene was the resin used in Examples 71 and 72; Amoco 1046 polypropylene was used in Examples 73–78, no Araldite polyepoxide was added.

The results of the tests performed on molded specimens of the thus-obtained molding resins are given in Table VI below. Notes 1–7, 10, 11 and 13 are the same as for Table I.

TABLE VI

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 71 | 0.88 wt. % Triton X-114 0.30 wt. % Carbowax 200 | 3(13) | 30.5 | — | 476 | 10.4 | 259 | — |
| 72 | None | 2(10,13) | 14.0 | — | 450 | 12.1 | 271 | — |
| 73 | 0.88 wt. % Triton X-114 0.30 wt. % Carbowax 200 | 11;fdw | 24.1 | — | 587 | — | — | — |
| 74 | 0.88 wt. % Triton X-114 0.30 wt. % Carbowax 200 | 13 | 24.0 | — | 465 | — | — | — |
| 75 | 0.88 wt. % Triton X-114 0.30 wt. % Carbowax 200 | 13 | 23.6 | — | 405 | — | — | — |
| 76 | 0.88 wt. % Triton X-114 0.30 wt. % Carbowax 200 | 13 | 25.5 | — | 509 | 6.5 | — | — |
| 77(11) | 1.1 wt. % Triton X-114 | 12 | 25.1 | — | 500 | 7.8 | — | — |
| 78(11) | 0.74 wt. % Triton X-114 | 11 | 22.5 | — | 517 | 7.3 | — | — |

EXAMPLES 79–84

The procedure of Examples 1–44 was again repeated in every essential detail except for the following:

the talc used was from a batch of Mistron 444 Australian talc (Cyprus Industrial Minerals Company; median particle size 4.8 μm, 80% of particles are finer than 14 μm, 20% of them are finer than about 1.2 μm), in the case of Examples 80, 82 and 83, the talc used was undried, no Araldite polyepoxide was added.

The results of the tests performed on molded specimens of the thus-obtained molding resins are given in Table VII below. Notes 1–7, 10 and 11 are the same as for Table I.

than 26 μm and 20% of them are finer than 4.6 μm), and Suprafino Italian talc (Cyprus Industrial Minerals Company; median particle size is 5 μm, 80% of the particles are finer than 9.2 μm and 20% of them are finer than 2.2 μm) was used in Example 91, the Supra talc used in Example 88 was "classified fine" (median particle size 4.5 μm, 80% of the particles are finer than 8.6 μm, 20% of them are finer than 1.5 μm), the Supra talc used in Example was "classified coarse" (median particle size 18.0 μm, 80% of particles are finer than about 26.0 μm, 20% of them are finer than 11.5 μm), the Supra talc used in Example was "feed, unclassified" (median particle size 13.4 μm, 80% of the particles are finer than 25 μm, 20% of them are finer than 4.2 μm), in the case of Examples 85 and 87, the talc used was dried at 110° C. overnight,

TABLE VII

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 79 | 0.88 wt. % Triton X-114 0.30 wt. % Carbowax 200 | 7 | 25.6 | — | 436 | 10.8 | — | — |
| 80 | 1.02 wt. % Triton X-114 0.10 wt. % Carbowax 200 | 7 | 24.5 | — | 467 | — | — | — |
| 81 | 1.39 wt. % Triton X-114 0.10 wt. % Carbowax 200 | 6;fdw | 25.1 | — | 436 | — | — | — |
| 82(11) | 1.00 wt. % Armeen[14] DMTD | 11;fdw | 23.5 | — | 482 | — | 268 | — |
| 83(11) | 1.00 wt. % Carbowax 200 | 8 | 30.8 | — | 431 | — | — | — |
| 84(10) | None | 8 | 15.7 | — | 453 | 11.1 | 270 | — |

[14]Armeen DMTD is dimethyl(tallow alkyl)amine; manufactured by AKZO Chemie America.

EXAMPLES 85–91

The procedure of Examples 1–44 was again repeated in every essential detail except for the following:

the talc used in Examples 85–90 was Supra Italian talc (Cyprus Industrial Minerals Company; median particle size is 15 μm, 80% of the particles are finer no Araldite polyepoxide was added in Examples 85, 88, 89 and 90.

The results of the tests performed on molded specimens of the thus-obtained molding resins are given in Table VIII below. Notes 1–7, 10 and 11 are the same as for Table I.

TABLE VIII

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 85 | 0.90 wt. % Triton X-114 0.10 wt. % Carbowax 200 | 7 | 24.0 | — | 617 | — | — | — |
| 86(11) | 0.98 wt. % Carbowax 200 | 18 | 25.0 | 13.0 | — | 11.1 | — | — |
| 87(10) | None | 22 | 20.6 | 15.7 | 575 | 10.2 | — | 13.5 |
| 88(9,10) | None | 13;fdw | 18.9 | — | 747 | 10.3 | 288 | — |
| 89(9,10) | None | 20;fdw | 16.4 | — | 611 | 8.1 | — | — |
| 90(10) | None | 21;fdw | 17.9 | — | 632 | 6.3 | 278 | — |

TABLE VIII-continued

| Example | Additive(s) | Oven Aging[1] | GE Bright-ness[2] | Hunterlab Yellowness Index[3] | Flexural Modulus[4] | Gardner Impact Strength[5] | Heat Deflection Temperature[6] | Melt Index[7] |
| --- | --- | --- | --- | --- | --- | --- | --- | --- |
| 91(10) | None | 19;fdw | 23.5 | — | 714 | — | 275 | — |

Polymeric molding resins filled with unbeneficiated, inferior talcs, e.g., polypropylene molding compositions filled with untreated Montana talc, can emit unpleasant odors while being molded or extruded, and afterwards as well. Such odors are perhaps caused by the talc's degradative attack on the polymer matrix. In any event, they impose yet another limitation on such compositions' range of utility, since such compositions cannot be used to make articles such as molded storage containers, refrigerator linings, shipping containers, etc. which will be placed near or in contact with foods.

The beneficiated talcs of this invention alleviate or substantially eliminate this problem as well, as can be seen from the results of the odor test described in the following example.

EXAMPLE 92

A 400 gram sample of each of the following materials was processed through the extruder and made into pellet form;
unfilled Amoco 1046 polypropylene resin,
40 weight % C-400 Panamint talc (Cyprus Industrial Minerals Company; median particle size 5.6 μm, 80% of the particles are finer than 14.5μm, 20% of them are finer than 1.8 μm) in Amoco 1046 polypropylene,
40 weight % Beaverwhite 325 Montana Yellowstone talc in Amoco 1046 polypropylene,
40 weight % Beaverwhite 325 Montana Yellowstone talc in Amoco 1046 polypropylene beneficiated with 0.42 weight percent of each of Triton X-114 and Carbowax 200,
40 weight % Beaverwhite 325 Montana Yellowstone talc beneficiated with 0.88 weight percent of Triton x-114 and 0.30 weight percent Carbowax 200, was placed in its own half gallon glass bottle and sealed with a cap having an odor-free metal foil liner.

Room Temperature Test

Five individuals opened the cap of each bottle, in turn, lowered their faces as close to the opening as possible, inhaled twice, deeply, and then rated the odor from each sample.

Elevated Temperature Test

Another set of the above-listed samples was heated in open air in a circulating air oven at 80° C. for 1 hour. Four hundred grams of each sample was then immediately bottled in a half gallon glass bottle having a cap with an odor free metal foil liner, the caps were sealed, and the bottled samples let stand until they reached room temperature. The same five individuals followed the same procedure as described above to rate the odor from each sample.

The average ratings obtained in those tests were as follows:

TABLE IX

| Filler | Room Temperature Odor Rating[1] | Odor Rating After 1 Hour at 80° C. |
| --- | --- | --- |
| Unfilled Amoco 1046 polypropylene resin | 1.8 | 2.4 |
| C-400 Panamint talc | 1.4 | 1.9 |
| Unbeneficiated Montana Yellowstone talc | 2.4 | 2.8 |
| Montana Yellowstone talc beneficiated with 0.42 wt. % of each of Triton X-114 and Carbowax 200 | 1.2 | 1.6 |
| Montana Yellowstone talc beneficiated with 0.88 wt. % Triton X-114 and 0.30 wt. % Carbowax 200 | 1.4 | 1.4 |

[1]0 = none, 1 = slight, 2 = moderate, 3 = severe.

EXAMPLES 93–106

The procedure of Examples 1–44 was again repeated in every essential detail except for the following:
a. air classified Beaverwhite 325 Montana Yellowstone talc coarse fraction, median particle size 7.7 μm (Examples 93–100),
b. C-400 Panamint talc (Examples 101–106),
TiO₂ [Dorsett and Jackson Tioxide R-CR40; specific gravity=4.0, oil absorption (g/100 g pigment)=17] was added in certain of these runs in the amounts indicated in Table X below,
the talcs used in each of these examples were dried,
no Araldite polyepoxide was added.

The results of the tests performed on molded specimens of the thus-obtained molding resins are given in Table X below. Notes 1–7 and 10 and are the same as for Table I.

TABLE X

| Example | Additive(s) | TiO₂ | Oven Aging[1] | GE Bright-ness[2] | Hunterlab Yellowness Index[3] | Flexural Modulus[4] | Gardner Impact Strength[5] | Heat Deflection Temperature[6] | Melt Index[7] |
| --- | --- | --- | --- | --- | --- | --- | --- | --- | --- |
| 93 | 0.88 wt. % Triton X-114 0.30 wt. % Carbowax 200 | None | 12 | 22.0 | — | 396 | — | — | — |
| 94 | 0.42 wt. % Triton X-114 0.42 wt. % Carbowax 200 | None | 11 | 20.6 | — | — | — | — | — |
| 95 | 0.42 wt. % Triton X-114 0.42 wt. % Carbowax 200 | 0.52 phc(15) | 11 | 62.6 | — | — | — | — | — |
| 96 | 0.88 wt. % Triton X-114 0.30 wt. % Carbowax 200 | 0.52 phc | 13 | 65.1 | — | 395 | — | — | — |
| 97 | 0.88 wt. % Triton X-114 0.30 wt. % Carbowax 200 | 1.05 phc | 11 | 72.7 | — | 402 | — | — | — |
| 98 | 0.88 wt. % Triton X-114 | 1.49 phc | 11 | 75.8 | — | 411 | — | — | — |

TABLE X-continued

| Example | Additive(s) | TiO$_2$ | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|---|
| 99 | 0.30 wt. % Carbowax 200<br>0.42 wt. % Triton X-114 | 1.05 phc | 10 | 67.7 | — | — | — | — | — |
| 100(10) | 0.42 wt. % Carbowax 200<br>None | None | 2 | 9.3 | — | — | — | — | — |
| 101 | 0.88 wt. % Triton X-114 | None | 10 | 26.6 | — | — | — | — | — |
| 102 | 0.30 wt. % Carbowax 200<br>0.42 wt. % Triton X-114<br>0.42 wt. % Carbowax 200 | None | 12 | 25.6 | — | — | — | — | — |
| 103(10) | None | None | 5;fdw | 16.1 | — | — | 5.2 | — | — |
| 104(10) | None | 0.50 phc | 5;fdw | 57.1 | — | — | — | — | — |
| 105(10) | None | 1.01 phc | 5 | 64.7 | — | — | — | — | — |
| 106(10) | None | 1.53 phc | 5 | 69.7 | — | — | — | — | — |

(15) phc = Parts of TiO$_2$ per hundred parts of resin, talc and other additives.

The TiO$_2$ concentrations together with the GE brightness results obtained for the molded specimens of Examples 6 (control), 96, 97, 98, 103 (control) 104, 105 and 106 were graphed in FIG. 3.

A particularly preferred group of beneficiating compositions coming within the scope of the present invention encompasses those amounts of octyl-or nonylphenol/poly(ethylene oxide) condensates and poly-(ethylene glycols) or alkoxypoly (ethylene glycols) which, when applied to a talc filler hitherto considered incompatible or unsuitable for use with commercially available, heat stabilized polypropylene resins, provide molded articles having a positive (greater than zero) performance index (P.I.; see FIG. 2) as measured by the following equation:

$$P.I. = (GEB - A) + (OA - B)$$

where:
GEB = percent brightness of the talc-filled polypropylene sample measured by the above-described procedure or an equivalent procedure;
OA = oven life of the talc-filled polypropylene sample measured in days at 155° C. by the above-described procedure or an equivalent procedure;
A and B = constants selected to insure that only those beneficiating compositions from among all those within a given consistent data set which in fact provide the highest levels of brightness and oven life are those which will give a positive performance index.

Ordinarily, A and B will be selected to insure that no more than 20–30% of the beneficiating compositions within a given consistent data set provide positive performance index values, and P.I. will always assume a zero value if either the left hand [(GEB-A)] or right hand [(OA-B)] quantity is less than zero. Accordingly, for P.I. to be greater than zero, the values for both brightness and oven life must exceed the minimums set by A and B, respectively.

If certain stabilizers, antioxidants, or the like are added to these beneficiated talc-filled polypropylene molding resins, the basic threshold brightness and oven life values (those above which the performance index will be positive) may increase, and thus A and B may increase as well. For example, for molding resin compositions made up of Amoco 1046 polypropylene filled with Beaverwhite 325 Montana Yellowstone talc beneficiated with Triton X-114 and Carbowax 200 to which no Araldite polyepoxide was added, A and B were determined to be 24.0 and 11.0, respectively. When 1.0 part of Araldite polyepoxide per hundred parts of polypropylene (0.06 wt. %) was added, A and B were determined to be 26.2 and 15.0, respectively.

Table XI lists performance indexes determined for articles molded from the filled, 0.06 wt. % Araldite polyepoxide-containing resins of the indicated working examples, together with performance indexes determined for molded articles in which the talc filler was treated with one but not both of Triton X-114 and Carbowax 200.

TABLE XI

| Example No. | Triton X-114* | Carbowax 200* | GEB % | OA (DAYS) | P.I.** |
|---|---|---|---|---|---|
| 11 | 1.16 | 0.42 | 27.6 | 19 | 5.4 |
| 6 | 0.88 | 0.30 | 27.1 | 19 | 4.9 |
| 5 | 0.63 | 0.63 | 27.4 | 18 | 4.2 |
| 7 | 0.28 | 1.10 | 28.1 | 16 | 2.9 |
| 9 | 0.84 | 0.84 | 26.7 | 16 | 1.5 |
| 10 | 0.87 | 0.31 | 26.3 | 16 | 1.1 |
| 4 | 0.21 | 0.70 | 26.5 | 15 | 0.3 |
| 12 | 0.63 | 0.63 | 26.3 | 15 | 0.1 |
| 21 | 0 | 0 | 10.9 | 1 | 0 |
| 22 | 0 | 2.00 | 29.2 | 14 | 0 |
| 1 | 0.42 | 0.42 | 26.0 | 13 | 0 |
| 24 | 0 | 0.98 | 27.7 | 11 | 0 |
| 25 | 0.74 | 0 | 24.5 | 14 | 0 |
| 3 | 0.59 | 0.20 | 25.6 | 19 | 0 |
| 27 | 1.10 | 0 | 26.1 | 19 | 0 |
| 28 | 0 | 1.47 | 27.5 | 13 | 0 |
| — | 0 | 1.96 | 28.2 | 13 | 0 |
| — | 0 | 0.98 | 25.7 | 12 | 0 |
| — | 0 | 1.47 | 27.5 | 13 | 0 |
| — | 0 | 0.49 | 21.9 | 10 | 0 |
| 30 | 1.47 | 0 | 24.9 | 18 | 0 |
| 8 | 0.42 | 1.40 | 29.2 | 13 | 0 |
| — | 1.10 | 0 | 23.0 | 16 | 0 |
| — | 0.74 | 0 | 19.7 | 15 | 0 |
| 13 | 0.58 | 0.21 | 25.6 | 15 | 0 |
| 14 | 0.42 | 0.42 | 25.2 | 14 | 0 |
| 15 | 0.32 | 1.06 | 28.2 | 14 | 0 |
| 16 | 0.21 | 0.70 | 26.0 | 13 | 0 |

*Wt. %, based on wt. of talc
**A = 26.2; B = 15.0

It has also been discovered that Montana talc and like talcs hitherto regarded as incompatible or unsuitable fillers for thermoplastic resinous compositions, and particularly polypropylene molding resins, then treated with particular amounts of certain amines, and especially trialkanolamines such as triethanolamine, triisopropanolamine and the like in addition to the mixtures of octyl- or nonylphenol/poly(ethylene oxide) condensates and poly (ethylene glycols) or alkoxypoly(ethylene glycols) described hereinabove, can effect still further improvements, in comparison to the unbeneficiated talc, in both color ("warmer" tan colors are obtained) and oven aging, with no diminution in flexural modulus, in polypropylene molded articles filled with such beneficiated talcs.

The amounts of amine employed can range from about 0.05% to about 1.2% by weight, and preferably from about 0.1% to about 0.3% by weight, based on the weight of the talc being treated. The amine can be added to the talc in the same manner as the other beneficiating materials described above.

This surprising result—amines are known to act as color formers in plastic molding compositions—is illustrated by the following examples.

EXAMPLES 107–118

The procedure of Examples 1–44 was again repeated in every essential detail, except for the following:

a different batch of Beaverwhite 325 Montana Yellowstone talc having approximately the same physical characteristics as that used in Examples 1–44 was used, the talcs used in each of these examples were undried, no Araldite polyepoxide was added, triethanolamine was added as indicated in Table XI below, the talcs in Examples 110, 112, 116 and 188 were used at 20 weight percent loadings.

The results of the tests performed on molded specimens of the thus-obtained molding resins are given in Table XI. Notes 1–7 and 11 are the same as for Table I. The data from Table I for Examples 26 and 29 is repeated for purposes of comparison.

The above discussion of this invention is directed primarily to preferred embodiments and practices thereof. It will be readily apparent to those skilled in the art that further changes and modifications in the actual implementation of the concepts described herein can readily be made without departing from the spirit and scope of the invention as defined by the following claims.

What is claimed is:

1. A moldable thermoplastic resinous composition comprising:
   (A) a beneficiated talc filler comprising a talc regarded, in the unbeneficiated states, as incompatible or unsuitable for use as a filler for thermoplastic resinous compositions, admixed with an effective amount of:
      (a) one or a mixture or octyl-or nonylphenyl/poly(ethylene oxide) condensates, and
      (b) one or a mixture of poly(ethylene glycols) or alkoxypoly(ethylene glycols); and
   (B) a moldable -hermoplastic resin.

2. A composition as recited in claim 1 in which said (a) is an octylphenol/poly(ethylene oxide) condensate.

3. A composition as recited in claim 1 in which said (b) is a poly(ethylene glycol).

4. A composition as recited in claim I in which said (a) is an octylphenol/poly(ethylene oxide) condensate having an average of 7–8 ethylene oxide units in its ether side chain and said (b) is a poly(ethylene glycol)

TABLE XI

| Example | Additive(s) | Oven Aging[1] | GE Brightness[2] | Hunterlab Yellowness Index[3] | Flexural Modulus[4] | Gardner Impact Strength[5] | Heat Deflection Temperature[6] | Melt Index[7] |
|---|---|---|---|---|---|---|---|---|
| 26[11] | 1.16 wt. % triethanolamine | 9 | 25.2 | 38.3 | 470 | 7.6 | — | 10.0 |
| 29[11] | 0.53 wt. % triethanolamine 0.50 wt. % Carbowax 200 | 14;fdw | 21.7 | 40.8 | 429 | 7.9 | — | — |
| 107 | 0.10 wt. % triethanolamine 0.82 wt. % Triton X-114 0.28 wt. % Carbowax 300 | 20 | 27.7 | — | 424 | — | — | — |
| 108 | 0.30 wt. % triethanolamine 0.67 wt. % Triton X-114 0.23 wt. % Carbowax 300 | 21 | 21.2 | — | 445 | — | — | — |
| 109 | 0.125 wt. % triethanolamine 0.8015 wt. % Triton X-114 0.2735 wt. % Carbowax 300 | 18 | 25.0 | — | 459 | 6.8 | — | — |
| 110 | 0.125 wt. % triethanolamine 0.8015 wt. % Triton X-114 0.2735 wt. % Carbowax 300 | 37 | 24.1 | — | 339 | — | — | — |
| 111 | 0.150 wt. % triethanolamine 0.7829 wt. % Triton X-114 0.2672 wt. % Carbowax 300 | 22 | 23.4 | — | 472 | — | — | — |
| 112 | 0.150 wt. % triethanolamine 0.7829 wt. % Triton X-114 0.2672 wt. % Carbowax 300 | 38 | 24.2 | — | 352 | — | — | — |
| 113 | 0.175 wt. % triethanolamine 0.7642 wt. % Triton X-114 0.268 wt. % Carbowax 300 | 24 | 22.8 | — | 492 | 7.1 | — | — |
| 114 | 0.175 wt. % triethanolamine 0.7642 wt. % Triton X-114 0.2608 wt. % Carbowax 300 | 41;fdw | 23.0 | — | 348 | — | — | — |
| 115 | 0.200 wt. % triethanolamine 0.7457 wt. % Triton X-114 0.2545 wt. % Carbowax 300 | 24 | 21.5 | — | 491 | 6.3 | — | — |
| 116 | 0.200 wt. % triethanolamine 0.7457 wt. % Triton-114 0.2545 wt. % Carbowax 300 | 36 | 23.7 | — | 360 | — | — | — |
| 117 | 0.250 wt. % triethanolamine 0.7083 wt. % Triton X-114 0.2417 wt. % Carbowax 300 | 22 | 21.5 | — | 473 | — | — | — |
| 118 | 0.250 wt. % triethanolamine 0.7083 wt. % Triton X-114 0.2417 wt. % Carbowax 300 | 35 | 21.5 | — | 356 | — | — | — | having a molecular weight of from about 200 to about 300.

5. A composition as recited in claim 1 in which said talc is a montana talc and said octyl- or nonylphenol/poly(ethylene oxide) condensate and said poly(ethylene glycol) or alkoxypolyethylene glycol) are each present in an amount ranging from about 0.05% to about 4.0% by weight, with the total combined amount of said substances being no more than about 5.0% by weight, said weight percents being based on the weight of the unbeneficiated talc.

6. A composition as recited in claim 1 in which said talc is a Montana talc and said octyl—or nonylphenol/poly(ethylene oxide) condensate and said poly(ethylene glycol) or alkoxypoly(ethylene glycol) are each present in an amount ranging from about 0.2% to about 1.5% by weight, with the total combined amount of said substances being no more than about 3.0% by weight, said weight percents being based on the weight of the unbeneficiated talc.

7. A composition as recited in claim 1 in which the thermoplastic resin is a polyolefin.

8. A composition as recited in claim 7 in which the polyolefin is polypropylene.

9. A composition as recited in claim 8 which also contains a heat stabilizer.

10. A molded article comprising a composition as recited in any one of claims 1-9, inclusive.

* * * * *